United States Patent
Seko et al.

(10) Patent No.: US 7,777,914 B2
(45) Date of Patent: Aug. 17, 2010

(54) IMAGE-PROCESSING DEVICE AND METHOD USING COMBINED COLOR CORRECTION TABLE

(75) Inventors: Masayuki Seko, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1730 days.

(21) Appl. No.: 10/482,258

(22) PCT Filed: Jun. 25, 2002

(86) PCT No.: PCT/JP02/06333
§ 371 (c)(1), (2), (4) Date: Jun. 25, 2004

(87) PCT Pub. No.: WO03/001791
PCT Pub. Date: Jan. 3, 2003

(65) Prior Publication Data
US 2004/0233484 A1    Nov. 25, 2004

(30) Foreign Application Priority Data
Jun. 26, 2001    (JP)    ............................. 2001-192937

(51) Int. Cl.
*G06F 15/00*    (2006.01)
*G06K 1/00*    (2006.01)
*H04N 1/60*    (2006.01)
*G06K 15/00*    (2006.01)
*H04N 1/40*    (2006.01)

(52) U.S. Cl. ...................... 358/1.9; 358/3.23
(58) Field of Classification Search .................. 358/1.1, 358/1.9, 504, 518
See application file for complete search history.

(56) References Cited

U.S. PATENT DOCUMENTS 5,313,291 A * 5/1994 Appel et al. ................ 358/501
(Continued)

FOREIGN PATENT DOCUMENTS

EP    0 599 495    6/1994
(Continued)

OTHER PUBLICATIONS

Abstract of Japanese Patent Publication No. 2000-122825 Pub. Date: Apr. 28, 2000, Patent Abstracts of Japan.
(Continued)

*Primary Examiner*—Douglas Q Tran
(74) *Attorney, Agent, or Firm*—Martine Penilla & Gencarella, LLP

(57) ABSTRACT

An image-processing device adapted to the increased types of color printers without excessive manpower includes a common color correction unit, which carries out a conversion (color correction or customization) common to the models of color printers. Therefore, the method for conversion does not need to be changed depending on the type of color printer. As a result, color correction mode-adapted LUTs, stored color correction LUTs, and light source correction LUTs needed for the common color correction unit do not increase even if the models of color printers increase, and common LUTs can be used. Consequently, the manpower needed to fabricate the color correction mode-adapted LUTs, stored color correction LUTs, and light source correction LUTs does not increase even if the models of printers increase, so that the image-processing device can be adapted to an increase of the models of color printers without excessive manpower.

6 Claims, 4 Drawing Sheets

U.S. PATENT DOCUMENTS

| | | | |
|---|---|---|---|
| 5,739,927 A * | 4/1998 | Balasubramanian et al. | 358/518 |
| 6,014,457 A | 1/2000 | Kubo et al. | |
| 6,781,716 B1 * | 8/2004 | Yoda | 358/1.9 |

FOREIGN PATENT DOCUMENTS

| | | |
|---|---|---|
| EP | 0 660 590 | 6/1995 |
| EP | 1 107 176 | 6/2001 |
| JP | 63-151267 | 6/1988 |
| JP | 02-096477 | 4/1990 |
| JP | 09-098300 | 4/1997 |
| JP | 10-145626 | 5/1998 |
| JP | 11-017963 | 1/1999 |
| JP | 2000-122825 | 4/2000 |
| JP | 2001-036762 | 2/2001 |
| JP | 2001-111859 | 4/2001 |
| JP | 2001111859 A * | 4/2001 |
| JP | 2001-128018 | 5/2001 |
| JP | 2002-077659 | 3/2002 |

OTHER PUBLICATIONS

Abstract of Japanese Patent Publication No. 2001-128018 Pub. Date: May 11, 2001, Patent Abstracts of Japan.
Abstract of Japanese Patent Publication No. 63-151267 Pub. Date: Jun. 23, 1988, Patent Abstracts of Japan.
Abstract of Japanese Patent Publication No. 02-096477, Pub. Date: Apr. 9, 1990, Patent Abstracts of Japan.
Abstract of Japanese Patent Publication No. 09-098300, Pub. Date: Apr. 8, 1997, Patent Abstracts of Japan.
Abstract of Japanese Patent Publication No. 10-145626 Pub. Date: May 29, 1998, Patent Abstracts of Japan.
Abstract of Japanese Patent Publication No. 11-017963, Pub. Date: Jan. 22, 1999, Patent Abstracts of Japan.
Abstract of Japanese Patent Publication No. 2001-036762, Pub. Date: Feb. 9, 2001, Patent Abstracts of Japan.
Abstract of Japanese Patent Publication No. 2001-111859 Pub. Date: Apr. 20, 2001, Patent Abstracts of Japan.
Abstract of Japanese Patent Publication No. 2002-077659, Pub. Date: Mar. 15, 2002, Patent Abstracts of Japan.

* cited by examiner

IMAGE-PROCESSING DEVICE AND METHOD USING COMBINED COLOR CORRECTION TABLE

TECHNICAL FIELD

The present invention relates to desired image processing applied to an image input signal supplied for an image output device such as a color printer.

BACKGROUND ART

Conventionally, color print has been carried out by transmitting color image data from a personal computer to a color printer. At this point, the RGB data generated by the personal computer is converted to CMYK data based on a color correction table (LUT: Look Up Table).

However, since there are various types of the image output devices, it is necessary to apply processing to the CMYK data according to the respective image output device. In addition, it is necessary to prepare the color correction table respectively for a medium on which printing is carried out such as paper on which the color printer applies printing, the resolution, and a color correction mode. Therefore, as many color correction tables as a number obtained by multiplying the number of types of the media, the resolutions, and the color correction modes by each other are necessary. The number of types of the media, the resolutions, and the color correction modes increases as the number of the models of the color printers is increasing recently, and thus the manpower for preparing the color correction LUTs are excessive.

In view of the foregoing, an object of the present invention is to provide image-processing device and method, a program, and a recording medium which can carry out a proper image processing without excessive manpower even if the models of image output devices such as a color printer increase.

DISCLOSURE OF INVENTION

According to one embodiment of the present invention, an image-processing device referring to a color correction table adapted to an image output device and a color correction table independent to image output devices to apply desired color correction to color image data, includes: a common color correction unit using the color correction table independent to the image output devices to apply color correction common to the image output devices to the color image data; and an individual color correction unit using the color correction table adapted to the image output device to apply color correction determined by the image output device to the color image data.

The common color correction unit carries out conversions common to the image output devices. Namely, it is not necessary to change the way of the conversions depending on the model of the image output devices. Therefore, even if the models of the image output devices increase, the LUT and the like required for the common color correction unit do not increase, and the common LUT and the like can be used Thus, since the manpower to create the LUT referred by the common color correction unit remain the same even when the models of the image output devices increase, it is possible to meet the increase of the models of the image output devices without excessive manpower.

According to one embodiment of the present invention, an image-processing device referring to a color correction table adapted to an image output device, a color correction table for correcting a stored color, and a color correction table for determining an output color characteristic to apply desired color correction to color image data, includes: an individual color correction unit using the color correction table adapted to the image output device to apply color correction determined by the image output device to the color image data; a stored color correction unit using the color correction table for the stored color to apply desired color correction to the color image data; and an output color characteristic determination color correction unit using the color correction table for determining the output color characteristic to apply color correction adapted to the output color characteristic to the color image data.

According to one embodiment of the present invention, an image-processing device referring to a color correction table adapted to an image output device, a color correction table for correcting a light source, and a color correction table for determining an output color characteristic to apply desired color correction to color image data, includes: an individual color correction unit using the color correction table adapted to the image output device to apply color correction determined by the image output device to the color image data; a stored color correction unit using the color correction table for correcting the light source to apply color correction eliminating influence from the light-source to the color image data; and an output color characteristic determination color correction unit using the color correction table for determining the output color characteristic to apply color correction adapted to the output color characteristic to the color image data.

According to one embodiment of the present invention, an image-processing device using one or more color correction tables adapted to an image output device and one or more color correction tables independent to image output devices to apply desired color correction to color image data, includes: a color correction table combination unit for combining the one or more color correction tables adapted to the image output device and the one or more color correction tables independent to the image output devices to generate a single combined color correction table, wherein desired color correction is applied to the color image data by referring to the combined color correction table.

In one embodiment, the color correction table adapted to the image output device includes a color correction table independent to output control and a color correction table adapted to the output control.

In one embodiment, the image-processing device further includes: a color correction table specification unit for specifying color correction tables to be combined, wherein the color correction table combination unit combines only the color correction tables specified by the color correction table specification unit.

According to one embodiment of to the present invention, an image-processing method referring to a color correction table adapted to an image output device and a color correction table independent to image output devices to apply desired color correction to color image data, includes: a common color correction step using the color correction table independent to the image output devices to apply color correction common to the image output devices to the color image data; and an individual color correction step using the color correction table adapted to the image output device to apply color correction determined by the image output device to the color image data.

According to one embodiment of the present invention, an image-processing method referring to a color correction table adapted to an image output device, a color correction table for correcting a stored color, and a color correction table for determining an output color characteristic to apply desired color correction to color image data, includes: an individual color correction step using the color correction table adapted to the image output device to apply color correction determined by the image output device to the color image data; a stored color correction step using the color correction table for the stored color to apply desired color correction to the color image data; and an output color characteristic determination color correction step using the color correction table for determining the output color characteristic to apply color correction adapted to the output color characteristic to the color image data.

According to one embodiment of the present invention, an image-processing method referring to a color correction table adapted to an image output device, a color correction table for correcting a light source, and a color correction table for determining an output color characteristic to apply desired color correction to color image data, includes: an individual color correction step using the color correction table adapted to the image output device to apply color correction determined by the image output device to the color image data; a stored color correction step using the color correction table for correcting the light source to apply color correction eliminating influence from the light source to the color image data; and an output color characteristic determination color correction step using the color correction table for determining the output color characteristic to apply color correction adapted to the output color characteristic to the color image data.

According to one embodiment of the present invention, an image-processing method using one or more color correction tables adapted to an image output device and one or more color correction tables independent to image output devices to apply desired color correction to color image data, includes: a color correction table combination step for combining the one or more color correction tables adapted to the image output device and the one or more color correction tables independent to the image output devices to generate a single combined color correction table, wherein desired color correction is applied to the color image data by referring to the combined color correction table.

In one embodiment, the present invention is implemented as a program of instructions for execution by the computer to perform an image-processing referring to a color correction table adapted to an image output device and a color correction table independent to image output devices to apply desired color correction to color image data, the program including: a common color correction step using the color correction table independent to the image output devices to apply color correction common to the image output devices to the color image data; and an individual color correction step using the color correction table adapted to the image output device to apply color correction determined by the image output device to the color image data.

In one embodiment, the present invention is implemented as a program of instructions for execution by the computer to perform an image-processing referring to a color correction table adapted to an image output device, a color correction table for correcting a stored color, and a color correction table for determining an output color characteristic to apply desired color correction to color image data, the program including: an individual color correction step using the color correction table adapted to the image output device to apply color correction determined by the image output device to the color image data; a stored color correction step using the color correction table for the stored color to apply desired color correction to the color image data; and an output color characteristic determination color correction step using the color correction table for determining the output color characteristic to apply color correction adapted to the output color characteristic to the color image data.

In one embodiment, the present invention is implemeted as a program of instructions for execution by the computer to perform an image-processing referring to a color correction table adapted to an image output device, a color correction table for correcting a light source, and a color correction table for determining an output color characteristic to apply desired color correction to color image data, the program including: an individual color correction step using the color correction table adapted to the image output device to apply color correction determined by the image output device to the color image data; a stored color correction step using the color correction table for correcting the light source to apply color correction eliminating influence from the light source to the color image data; and an output color, characteristic determination color correction step using the color correction table for determining the output color characteristic to apply color correction adapted to the output color characteristic to the color image data.

In one embodiment, the present invention is implemented as a program of instructions for execution by the computer to perform an image-processing using one or more color correction tables adapted to an image output device and one or more color correction tables independent to image output devices to apply desired color correction to color image data, the program including: a color correction table combination step for combining the one or more color correction tables adapted to the image output device and the one or more color correction tables independent to the image output devices to generate a single combined color correction table, wherein desired color correction is applied to the color image data by referring to the combined color correction table.

In one embodiment, the present invention is implemented as a computer-readable medium having the program according to any one of the above-described embodiments stored thereon.

BEST MODE FOR CARRYING OUT THE INVENTION

The following section describes preferred embodiments of the present invention while referring to Figures.

Hardware Constitution

Figure 1:
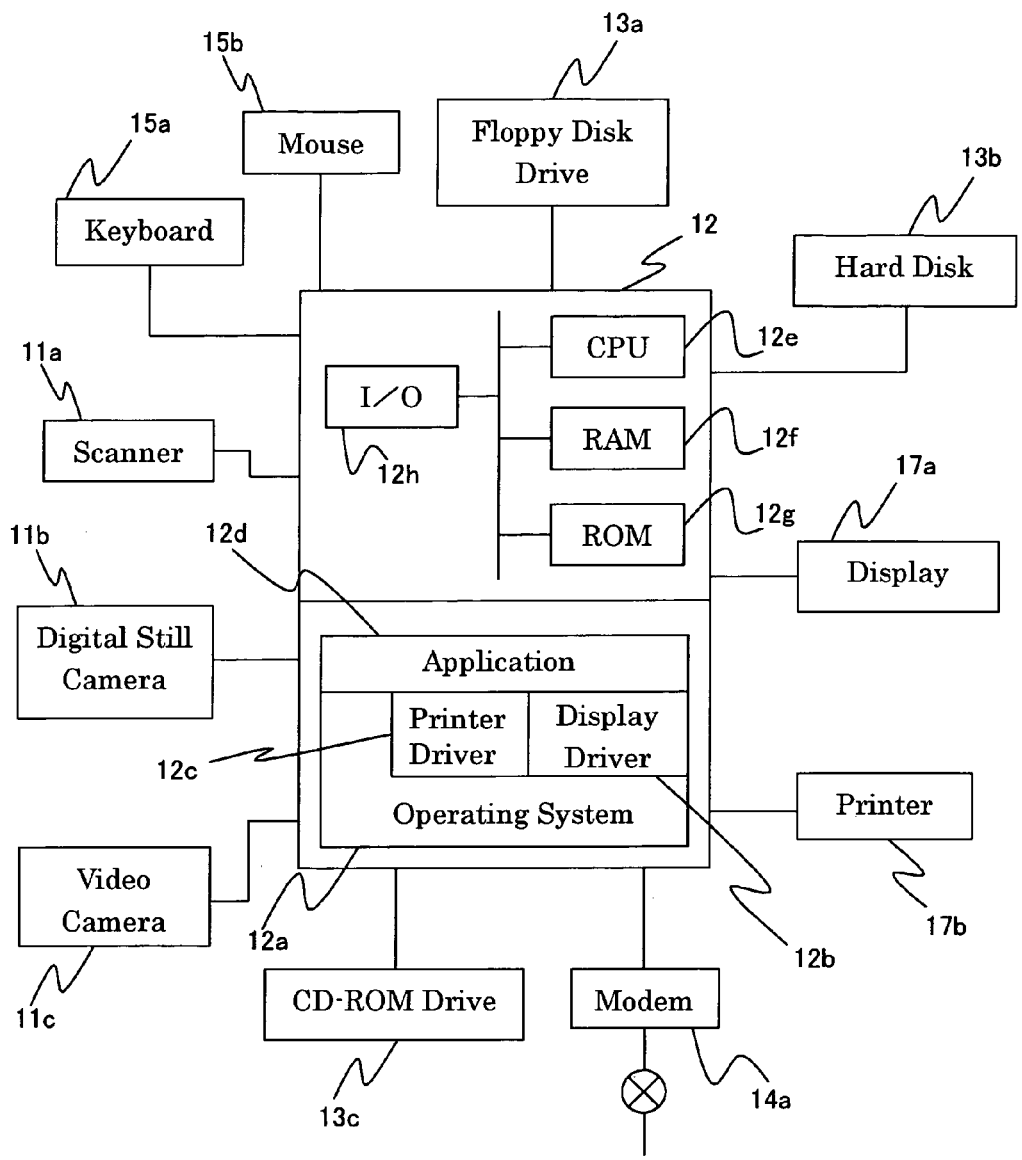
FIG. 1 is a block diagram for showing a hardware constitution of the image processing apparatus 1 according to an embodiment of the present invention.

FIG. 1 is a schematic block diagram showing an example of a concrete hardware constitution of the image processing apparatus according to the present invention.

The present embodiment employs a computer system as an example of hardware for the image processing apparatus. FIG. 1 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16,7 million colors by 256-gradation display in three primary colors including R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM as required A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provides with a display area including 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors including C, M, Y. and K. As image resolution, high density print such as 360×360 dpi or 720×720 dpi is available, and as gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver CDSP DRV) 12b and a printer driver (PRT DRV) 12c are integrated into the operating system 12a. The drivers 12b and 12c depend on the models of display 17a and the color printer 17b, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a or the color printer 17b, which serve as image output devices.

In the present invention, though the image processing apparatus is realized as a computer system, the computer system is not necessarily required, and a system that applies the process required in the present invention to similar image data is possible. A system where an image processing system for performing the image processing of present invention is integrated in a digital still camera, and image data after the image processing are used for printing through a color printer is possible. For a color printer, which obtains image data and prints without a computer system, it is possible to constitute such that the image processing of present invention is automatically applied on image data obtained through a scanner, a digital still camera, modem or the like and printing is processed.

The present invention is naturally applicable to different apparatuses for handling image data such as a color facsimile apparatus, a color copy apparatus or a projector as well.

Image-Processing Control Program

An image-processing control program according to the present invention is usually recorded in a form readable by the computer 12 on a recording medium such as a floppy disk and a CD-ROM for circulation. The program is read by a medium reading device (such as the CD-ROM drive 13c and the floppy disk drive 13a), and is installed on the hard disk 13b. The program is constituted such that the CPU then properly reads a desired program from the hard disk 13b so as to carry out desired processing. Note that the image-processing control program itself according to the present invention constitutes a part of the present applied invention.

First Embodiment

Figure 2:
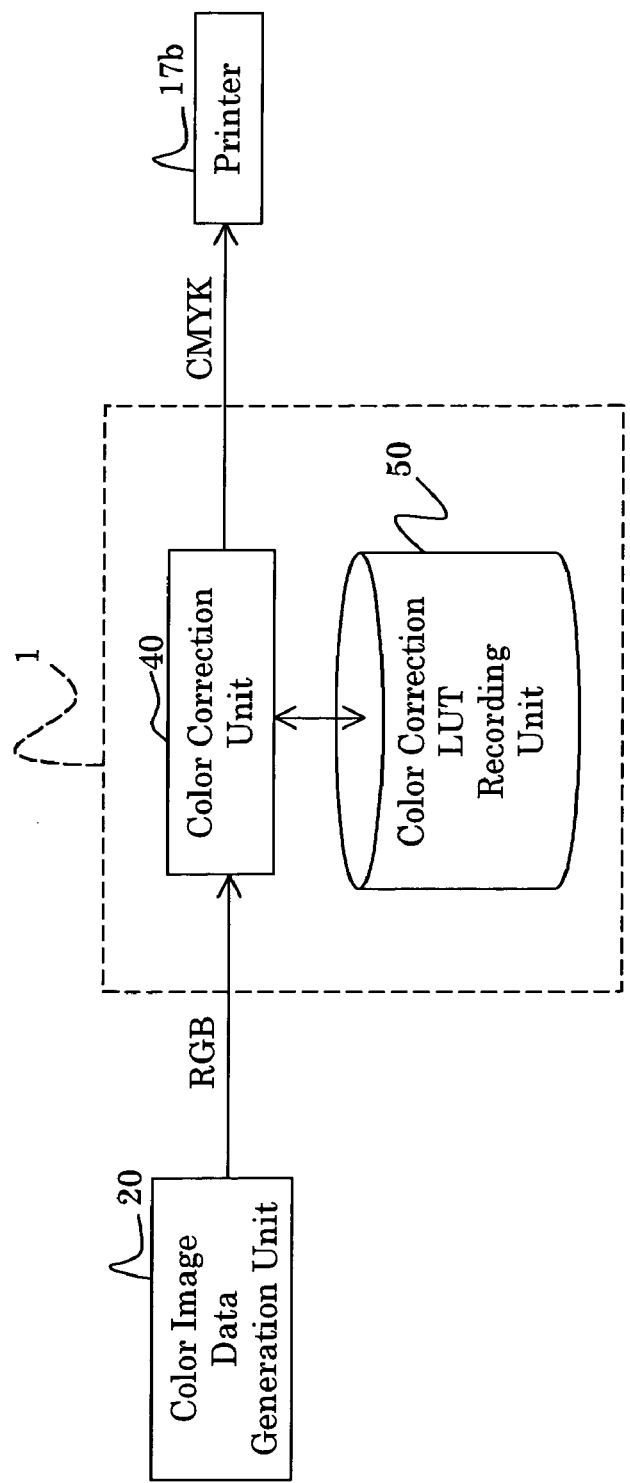
FIG. 2 is a block diagram for showing a constitution of the image processing apparatus 1 according to the present invention.

FIG. 2 is a block diagram showing the constitution of an image-processing device 1 according to a first embodiment. The image-processing device 1 is provided with a color correction unit (color correction device) 40 and a color correction LUT recording unit 50. The image-processing unit 1 applies desired processing to an RGB image signal supplied from a color image data generation unit 20 such as a scanner, a digital camera, and an application program, and supplies the printer 17b serving as an image output device with the result. In the present embodiment, description is given of a case where the image output device is a printer.

The color correction unit (color correction device) 40 converts the RGB image data output from the color image data generation unit 20 into image output device-adapted color image data (CMYK color space data) adapted to the printer 17b. The color correction unit 40 reads out a color correction LUT (Look Up Table: reference table) indicating a conversion rule for converting the color image data to the image output device-adapted color image data from the color correction LUT recording unit 50, and refers to the read-out color correction LUT to convert the color image data into the image output device-adapted color image data. The color correction LUT recording unit 50 stores the color correction LUT (Look Up Table: reference table) indicating the conversion rule for converting the color image data into the image output device-adapted color image data.

Figure 3:
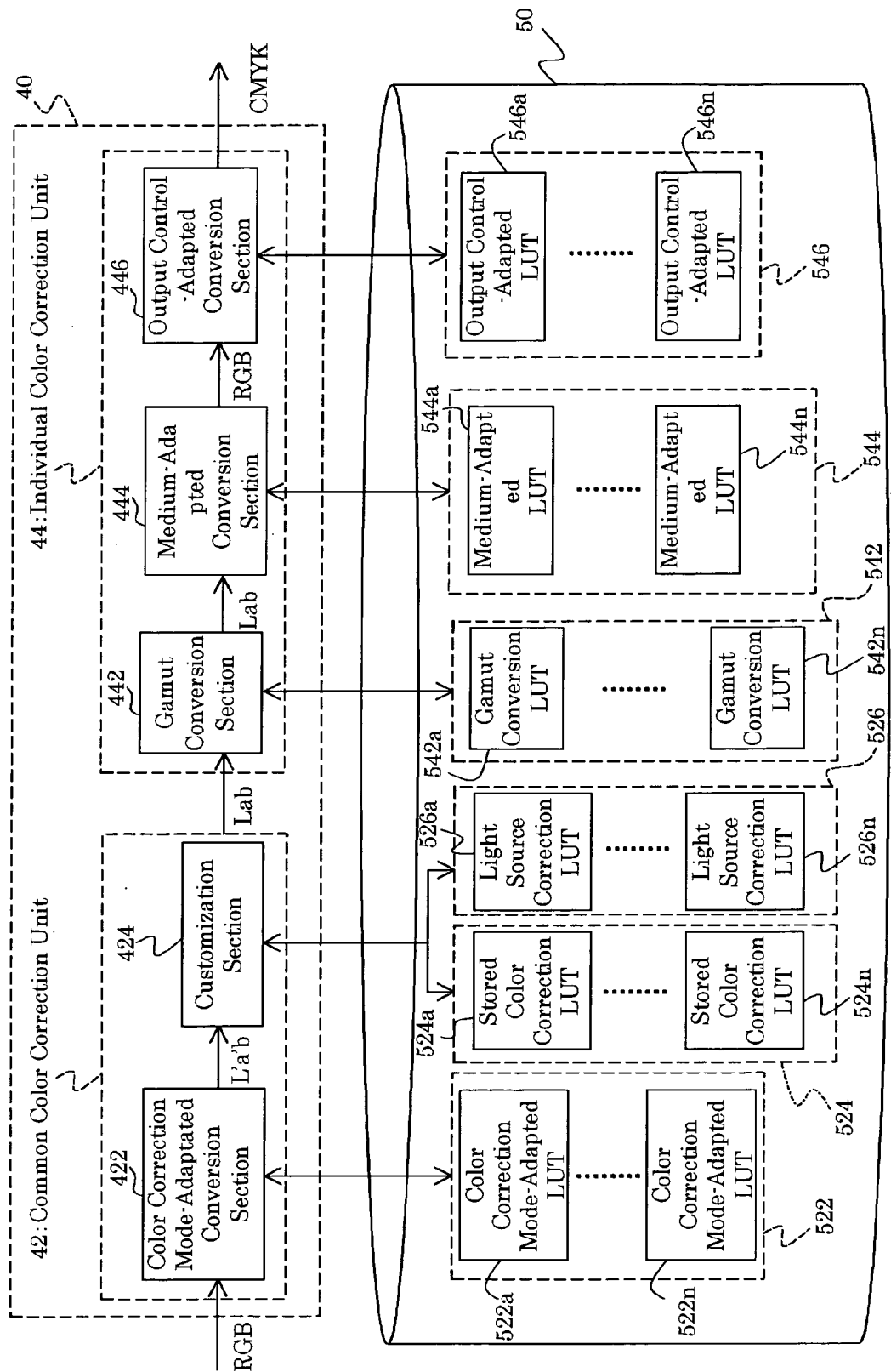
FIG. 3 is a block diagram showing the detailed constitution of a color correction unit (color correction device) 40 and a color correction LUT recording unit 50 according to a first embodiment of the present invention.

FIG. 3 is a block diagram showing a detailed constitution of the color correction unit (color correction device) 40 and the color correction LUT recording unit 50.

The color correction unit 40 is provided with a common color correction unit 42 and an individual color correction unit 44. The color correction LUT recording unit 50 stores multiple color correction mode-adapted LUTs 522a to 522n, multiple stored color correction LUTs 524a to 524n, multiple light source correction LUTs 526a to 526n, multiple gamut conversion LUTs 542a to 542n, multiple medium-adapted conversion LUT 544a to 544n, and multiple output control-adapted conversion LUTs 546a to 546n.

The common color correction unit 42 is provided with a color correction mode-adapted conversion section 422, and a customization section (stored color correction means and light source correction means) 424, and applies image processing common to the models of the printers 17b to the RGB color image data so as to convert the data into Lab color image data.

The color correction mode-adapted conversion section 422 refers to the color correction mode-adapted LUTs 522a to 522n so as to apply various color correction processes, which cause a conversion common to the models of the printers and which are adapted to a color correction mode of determining an output color characteristic, to the RGB color image input data, thereby converting the RGB color image input data into L'a'b' color image data. For example, the color correction processes include a color correction process causing a natural hue suitable for printing a photograph, and a color correction process causing a dark hue suitable for printing a chart. In the present embodiment, there exist multiple color correction modes, and the color correction mode-adapted LUTs 522a to 522n respectively adapt to the individual color correction modes. Since the color correction modes are common to the models of the printers 17b, the number of the color correction mode-adapted LUTs 522 does not increase even when the models of the printers 17b increase.

The customization section 424 applies desired stored color correction and light source correction to the color image data converted into the L'a'b' format. Namely, the customization section 424 corresponds to the stored color correction means or the light source correction means. An output from the customization section 424 serves as an output from the common color correction unit 42.

The customization section 424 serving as the stored color correction means applies the stored color correction while referring to the stored color correction LUTs 524a to 524n. A stored color implies a color which a human clearly memorizes with accompanying preoccupation. For example, the stored colors include the color of the human skin, the blue of the sky, and the yellow of the lemon. A human can distinguish even a slight difference in the stored color. Thus, it is preferable to convert color image data within a predetermined range in the color space intended for representing a stored color to color image data representing that stored color.

For example, it is assumed that Lab values for a certain stored color are $L=a=b=50$. Simultaneously, if the ranges of color image data input to the customization section 424 serving as the stored color correction means are $40 \leq L' \leq 60$, $40 \leq a' \leq 50$, and $40 \leq b' \leq 50$, the customization section 424 is constituted such that it determines that the color image data is color image data representing the stored color image data whose Lab values are $L=a=b=50$, and then, the L'a'b' values are converted to $L=a=b=50$.

In addition, the customization section 424 serving as the light source correction means applies light source correction while referring to the light source correction LUTs 526a to 526n. The light source mentioned here means a light source illuminating a medium such as print sheet on which a color output from the printer 17b is reproduced. Even if the same color is reproduced on the medium, an appeared color changes depending on the light source. For example, the appeared color changes between a case where a color reproduced on a medium is viewed under the natural light and a case where the color reproduced on the medium is viewed under the fluorescent. Thus, a light source is selected as a reference (such as natural light), and color image data is corrected so as to eliminate a difference between the color of the reference light source and the color of a light source (such as a fluorescent) actually illuminating the medium.

Note that the stored color correction LUTs 524a to 524n and the light source correction LUTs 526a to 526n are common to the models of the printers 17b. Thus, even when the models of the printers 17b increase, the number of the stored color correction LUTs 524a to 524n and the light source correction LUTs 526a to 526n does not increase.

The individual color correction unit 44 applies color correction process determined by the model of the printer 17b to the Lab color image data output from the common color correction unit 42 so as to convert the Lab color image data into the CMYK color image data.

The individual color correction unit 44 is provided with a gamut conversion section 442, a medium-adapted conversion section 444, and an output control-adapted conversion section 446. The gamut conversion section 442 corresponds to first individual color correction means, the medium-adapted conversion section 444 and the output control-adapted conversion section 446 correspond to second individual color correction means.

The gamut conversion section (first individual color correction means) 442 carries out a conversion independent to the output control (resolution) of the medium and the printer 17b in the Lab color space. Namely, the gamut conversion section 442 refers to the gamut conversion LUTs 542a to 542n to apply a gamut conversion to the color image data output from the common color correction unit 42 so that the color image data after the gamut conversion fits into a color space range reproducible by the printer 17b.

The medium-adapted conversion section (second individual color correction section) 444 and the output control-adapted conversion section (second individual color correction section) 446 correspond to the second individual color correction means which applies a conversion determined by the output control for the medium and the printer 17b to the output from the gamut conversion section 442 for supplying an output.

The medium-adapted conversion section (second individual color correction section) 444 refers to the medium-adapted LUTs 544a to 544n to carry out a conversion adapted to the medium. Note that the medium means a medium such as print sheet on which a color output from the printer 17b is reproduced. In the present embodiment, it is assumed that the medium-adapted conversion LUTs 544 respectively corresponding to multiple media for proper color reproduction are stored in the color correction LUT recording unit 50. Note that the medium-adapted conversion LUT 544 converts the color space from Lab to RGB.

The output control-adapted conversion section (second individual color correction section) 446 refers to the output control-adapted conversion LUTs 546a to 546n to carry out a conversion adapted to the medium. Note that the output control carried out by the printer 17b implies setting the resolution for printing (whether dot with a constant size or multi size dot (MSD)), for example. However, it is assumed that there exist two types of output control, and the output control-adapted LUTs 546 correspond to the respective types of the output control Note that the output control-adapted conversion LUT 546 converts the color space from RGB to CMYK.

The following section describes the operation of the first embodiment.

The color correction unit 40 refers to the color correction LUT read out from the color correction LUT recording unit 50 to apply color correction adapted to the printer 17*b* to the color image data generated by the color image data generation unit 20.

The common color correction unit 42 applies the conversions common to the printers 17*b* to the color image data input to the color correction unit 40. Namely, the color correction mode-adapted conversion section 422 applies correction adapted to the color correction mode, and the customizing section 424 applies the stored color correction or the light source correction. At this point, the referred LUTs are the color correction mode-adapted LUTs 522*a* to 522*n*, the stored color correction LUTs 524*a* to 524*n*, and the light source correction LUTs 526*a* to 526*n*. These are common to the models of the printers 17*b*, and the number of required LUTs does not increase even if the models of the printer 17b increase.

The individual color correction unit 44 applies the conversions determined by the printer 17*b* to the color image data converted by the common color correction unit 42. First, the gamut conversion section 442 applies the gamut conversion so as to fit the color image data into the range of the color space which can be output by the printer 17*b*. Then, the medium-adapted conversion section 444 carries out the conversion adapted to the medium, and the output control-adapted conversion section 446 carries out the conversion adapted to the output control. At this point, the LUTs to be referred to include the gamut conversion LUTs 542*a* to 542*n*, the medium-adapted conversion LUTs 544*a* to 544*n*, and the output control-adapted conversion LUTs 546*a* to 546*n*. These vary depending on the model of the printer 17*b*.

The output from the color correction unit 40 is transmitted to the printer 17*b*. The printer 17*b* carries out print based on the supplied image output device-adapted color image data.

With the first embodiment, the common color correction unit 42 applies the conversions common to the models of the printers 17*b* to the color image data and outputs the resultant color image data. Consequently, since the LUTs (color correction mode-adapted LUTs 522*a* to 522*n*, the stored color correction LUTs 524*a* to 524*n*, and the light source correction LUTs 526*a* to 526*n*) referred by the common color correction unit 42 are common to the models of the printers 17*b*, the number of the LUTs required by the common color correction unit 42 does not increase even when the models of the printers 17*b* increase Thus, since the manpower to fabricate the LUTs referred by the common color correction unit 42 remain the same even when the models of the printers 17*b* increase, it is possible to meet the increase of the models of the printers 17*b* without excessive manpower.

Second Embodiment

A second embodiment differs from the first embodiment in an LUT to be used, namely in combining conversion rules to generate a combined color correction LUT.

Figure 4:
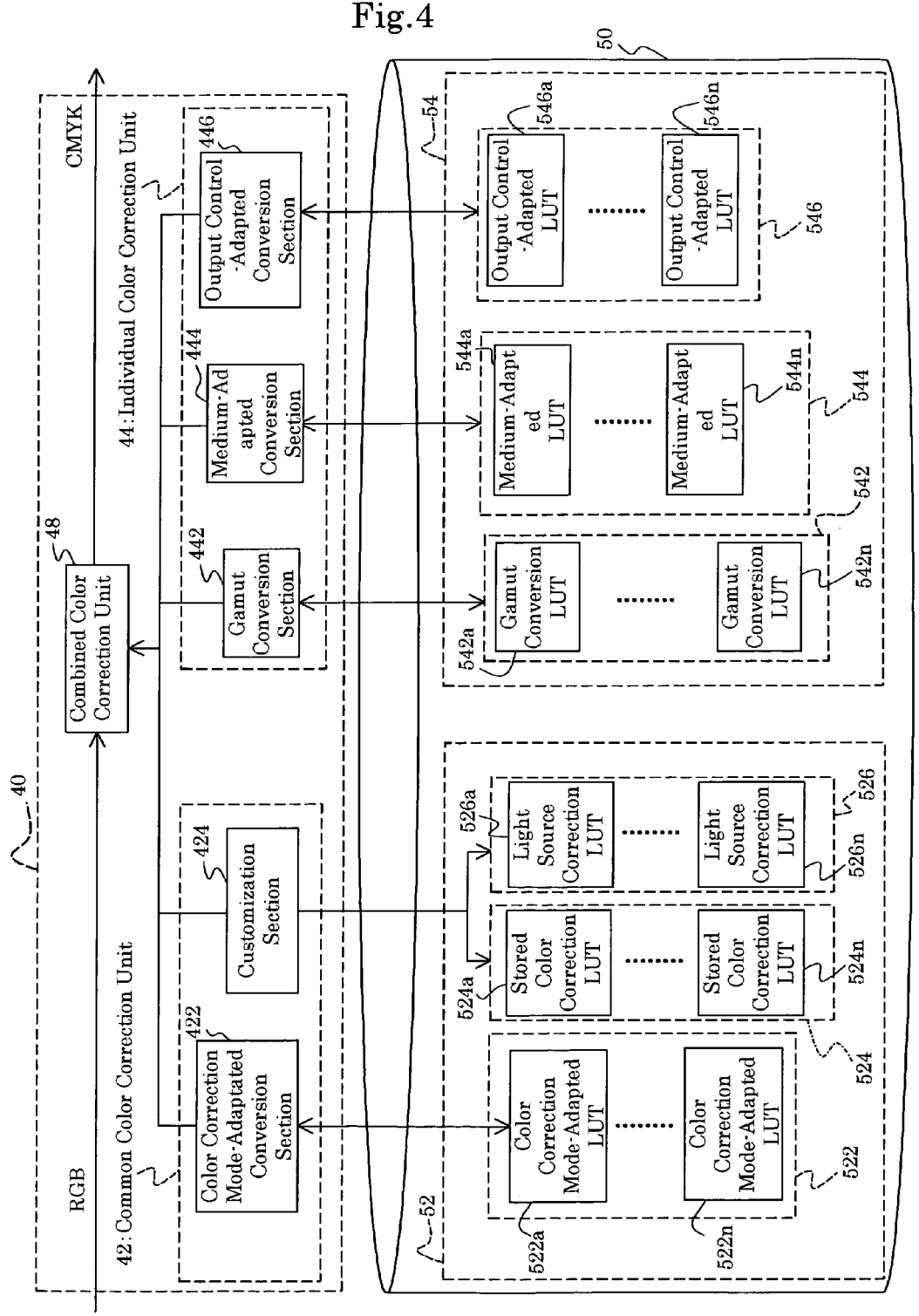
FIG. 4 is a block diagram showing the constitution of a color correction unit (color correction device) 40 and a color correction LUT recording unit 50 according to a second embodiment of the present invention.

The image-processing device 1 is provided with the color correction unit (color correction device) 40 and the color correction LUT recording unit 50. FIG. 4 shows the constitution of the color correction unit (color correction device) 40 and the color correction LUT recording unit 50 according to the second embodiment. In FIG. 4, the same reference numerals are assigned to the same constitution elements as those in the first embodiment shown in FIG. 3.

The color correction unit (color correction device) 40 is provided with the common color correction unit 42, the individual color correction unit 44, and a combined color correction unit 48.

The common color correction unit 42 and the individual color correction unit 44 read out LUTs stored in the color correction LUT recording unit 50, output the LUTs to the combined color correction unit 48, and do not carry out conversions of color image data by themselves.

The combined color correction unit 48 combines the multiple LUTs transmitted from the common color correction unit 42 and the individual color correction unit 44 to generate a combined color correction LUT. Then, the combined color correction unit 48 converts color image data output from the color image data generation unit 20 into image output device-adapted color image data, and outputs the resultant data to the printer 17*b* serving as the image output device. Note that combining LUTs implies to generate a single LUT, which outputs the image output device-adapted color image data when the color image data output from the color image data generation unit 20 is supplied as an input, based on the multiple LUTs supplied from the common color correction unit 42 and the individual color correction unit 44.

When the LUTs will be combined, it is preferable to specify LUTs to be actually used through the color correction LUT specification unit (not shown), and then to combine the specified LUTs. For example, when it is specified that the color correction mode-adapted LUT 522*a*, the light source correction LUT 526*b*, the gamut conversion LUT 542*b*, the medium-adapted conversion LUT 544*b*, and the output control-adapted conversion LUT 546*a* are used, it is preferable to combine only those LUTs. It is designated such that an LUT such as the color correction mode-adapted LUT 522*b* which is not specified is not combined The color correction LUT recording unit 50 is provided with a common conversion LUT recording unit 52 and an individual conversion LUT recording unit 54. The common conversion LUT recording unit 52 is provided with the color correction mode-adapted LUTs 522*a* to 522*n*, the stored color correction LUTs 524*a* to 524*n*, and the light source correction LUTs 526*a* to 526*n*. Similarly to the first embodiment, the color correction mode-adapted LUTs 522*a* to 522*n*, the stored color correction LUTs 524*a* to 524*n*, and the light source correction LUTs 526*a* to 526*n* are the common conversion LUTs storing the conversion rules common to the models of the printer 17*b* serving as the image output device. The individual conversion LUT recording unit 54 is provided with the gamut conversion LUTs 542*a* to 542*n*, the medium-adapted conversion LUTs 544*a* to 544*n*, and the output control-adapted conversion LUTs 546*a* to 546*n*. Similarly to the first embodiment, the gamut conversion LUTs 542*a* to 542*n*, the medium-adapted conversion LUTs 544*a* to 544*n*, and the output control-adapted conversion LUTs 546*a* to 546*n* are individual conversion LUTs storing the conversion rules determined by the model of the printer 17*b* serving as the image output device.

The following section describes the operation of a second embodiment.

Color image data generated by the color image data generation unit 20 is input to the color correction unit 40. The color correction unit 40 reads out LUT from the color correction LUT recording unit 50, and carries out color correction adapted to the printer 17*b*. Namely, the combined color correction unit 48 generates a single combined color correction LUT from the multiple common conversion LUTs and the multiple individual conversion LUTs, applies desired image-processing to the color image data supplied from the color image data generation unit 20 based on the combined color correction LUT so as to generate image output device-adapted color image data, and outputs the image output device-adapted color image data to the printer 17b serving as the image output device.

According to the second embodiment, effects similar to those of the first embodiment are provided. Since the number of LUTs required by the common color correction unit 42 does not increase even when the models of the printers 17b increase, the manpower to fabricate the LUT referred by the common color correction unit 42 remain the same. Thus, it is possible to meet the increase of the models of the printers 17b without excessive manpower. Further, since the color correction is carried out based on the combined color correction LUT, it is possible to reduce the number of references to the LUTs during the color correction, and to quickly carry out the color correction.

The invention claimed is:

1. An image-processing device using one or more color correction tables adapted to an image output device and one or more color correction tables independent of image output devices to apply desired color correction to color image data, comprising:
   a color correction table combination means for combining said one or more color correction tables adapted to said image output device and said one or more color correction tables independent of said image output devices to generate a single combined color correction table,
   wherein desired color correction is applied to said color image data by referring to said combined color correction table, and
   wherein said one or more color correction tables adapted to said image output device includes a color correction table independent of output control and a color correction table adapted to the output control.

2. An image-processing device using one or more color correction tables adapted to an image output device and one or more color correction tables independent of image output devices to apply desired color correction to color image data, comprising:
   a color correction table combination means for combining said one or more color correction tables adapted to said image output device and said one or more color correction tables independent of said image output devices to generate a single combined color correction table; and
   a color correction table specification means for specifying color correction tables to be combined,
   wherein desired color correction is applied to said color image data by referring to said combined color correction table, and
   wherein said color correction table combination means combines only said color correction tables specified by said color correction table specification means.

3. An image-processing method using one or more color correction tables adapted to an image output device and one or more color correction tables independent of image output devices to apply desired color correction to color image data, comprising:
   a color correction table combination step for combining said one or more color correction tables adapted to said image output device and said one or more color correction tables independent of said image output devices to generate a single combined color correction table,
   wherein desired color correction is applied to said color image data by referring to said combined color correction table, and
   wherein said one or more color correction tables adapted to said image output device includes a color correction table independent of output control and a color correction table adapted to the output control.

4. A computer-readable storage medium having a program stored thereon, said program comprising computer-executable instructions for causing a computer to perform image processing using one or more color correction tables adapted to an image output device and one or more color correction tables independent of image output devices to apply desired color correction to color image data, said program causing the computer to implement:
   a color correction table combination step for combining said one or more color correction tables adapted to said image output device and said one or more color correction tables independent to said image output devices to generate a single combined color correction table,
   wherein desired color correction is applied to said color image data by referring to said combined color correction table, and
   wherein said one or more color correction tables adapted to said image output device includes a color correction table independent of output control and a color correction table adapted to the output control.

5. An image-processing method using one or more color correction tables adapted to an image output device and one or more color correction tables independent of image output devices to apply desired color correction to color image data, comprising:
   a color correction table combination step for combining said one or more color correction tables adapted to said image output device and said one or more color correction tables independent of said image output devices to generate a single combined color correction table; and
   a color correction table specification step for specifying color correction tables to be combined,
   wherein desired color correction is applied to said color image data by referring to said combined color correction table, and
   wherein said color correction table combination step combines only said color correction tables specified in said color correction table specification step.

6. A computer-readable storage medium having a program stored thereon, said program comprising computer-executable instructions for causing a computer to perform image processing using one or more color correction tables adapted to an image output device and one or more color correction tables independent of image output devices to apply desired color correction to color image data, said program causing the computer to implement:
   a color correction table combination step for combining said one or more color correction tables adapted to said image output device and said one or more color correction tables independent to said image output devices to generate a single combined color correction table; and
   a color correction table specification step for specifying color correction tables to be combined,
   wherein desired color correction is applied to said color image data by referring to said combined color correction table, and
   wherein said color correction table combination step combines only said color correction tables specified in said color correction table specification step.

* * * * *